United States Patent [19]

Gargini

[11] 3,898,374

[45] Aug. 5, 1975

[54] WIRED BROADCASTING SYSTEMS

[75] Inventor: Eric John Gargini, West Drayton, England

[73] Assignee: Communications Patents Limited, London, England

[22] Filed: Oct. 9, 1973

[21] Appl. No.: 404,655

[30] Foreign Application Priority Data

Oct. 11, 1972 United Kingdom.............. 46966/72

[52] U.S. Cl. ........... 178/5.1; 178/DIG. 13; 325/308

[51] Int. Cl. ............................................ H04n 1/44

[58] Field of Search ....... 178/5.1, DIG. 13; 325/308

[56] References Cited

UNITED STATES PATENTS

| | | | |
|---|---|---|---|
| 3,399,271 | 8/1968 | Butcher et al. | 178/5.1 |
| 3,693,090 | 8/1969 | Gabriel | 325/308 |
| 3,733,430 | 5/1973 | Thompson et al. | 178/5.1 |
| 3,790,700 | 2/1974 | Callais et al. | 178/5.1 |

*Primary Examiner*—Maynard R. Wilbur

*Assistant Examiner*—S. C. Buczinski

*Attorney, Agent, or Firm*—Laurence R. Brown, Esq.

[57] ABSTRACT

A wired broadcasting system in which subscribers are connected through individual cables to a programme exchange incorporating means actuable by a subscriber for selecting a particular one of a plurality of programmes to be transmitted to the subscriber through his own individual channel. Means are provided for allocating the programmes into three or more groups, and means are provided at the exchange or at the subscriber units for selectively denying two or some of the groups of programmes to subscribers.

39 Claims, 2 Drawing Figures

WIRED BROADCASTING SYSTEMS

Figure 1:
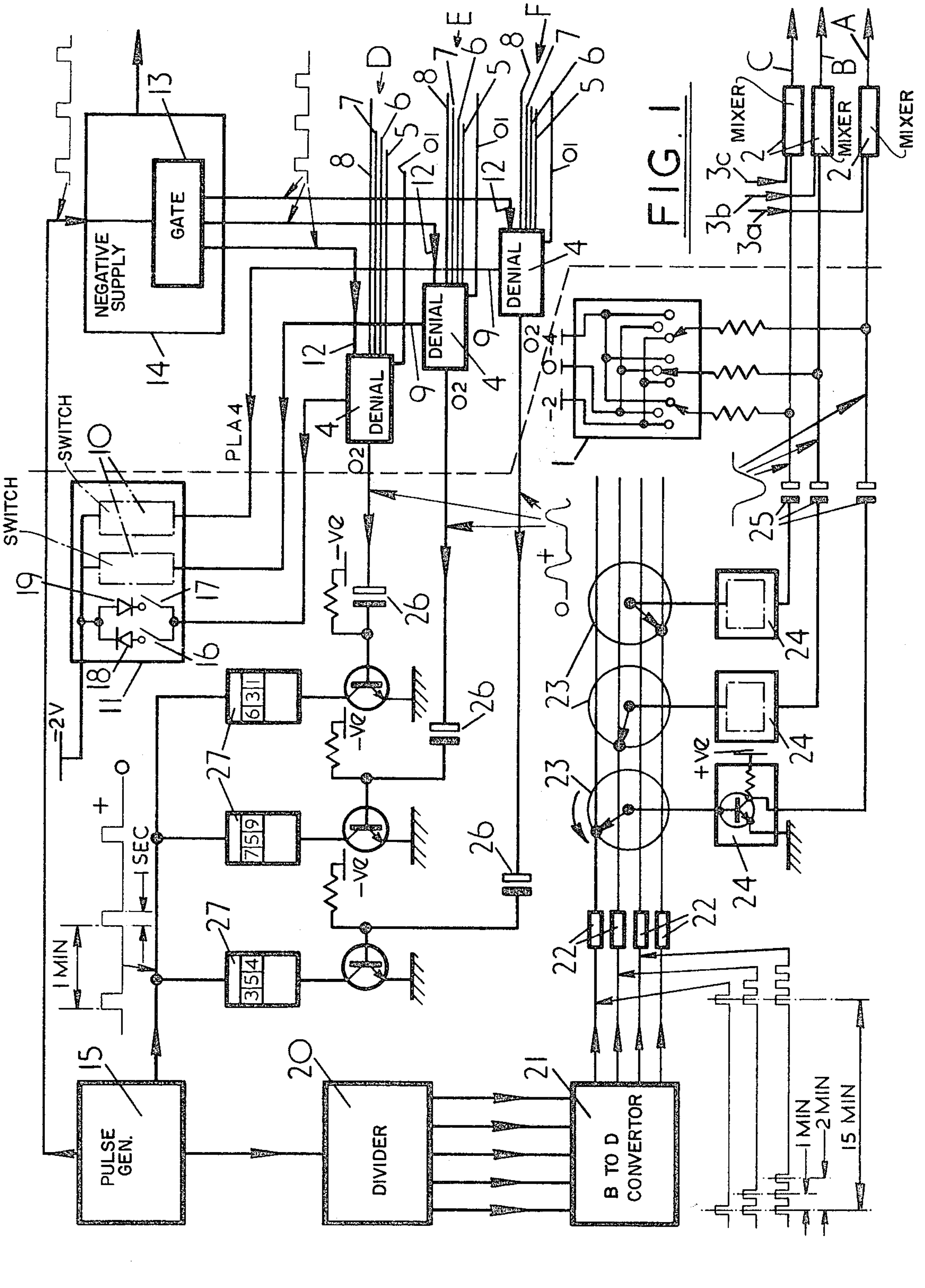

The present invention relates to wired broadcasting systems in which subscribers are connected through individual cables to a programme exchange incorporating switching means actuated by the subscriber for selecting a particular programme to be transmitted to the subscriber through his own individual cable. The cables may comprise high frequency twisted conductor pairs with intersticial conductors suitable for the transmission of control signals from the subscriber to the programme exchange for performing the selection function and optionally for performing other appropriate functions. References herein to "subscribers" are intended to include anyone provided with equipment for receiving information transmitted through the system.

The object of the present invention is to provide a wired broadcasting system having the features specified above and providing additional facilities which improve the usefulness of the system.

In the case of a wired broadcasting system offering a substantial number of programmes to subscribers it may be required to deny certain programmes to certain of the subscribers as and when required or appropriate, or it may be required to provide charge debiting facilities so that a fee can be collected from a subscriber receiving a particular programme, and the present invention is particularly directed to a system which provides these denial facilities and which furthermore provides for collecting different fees for different programmes.

A further facility which may be provided is means for supplying different programmes to certain subscribers through what may conveniently be termed "dedicated" channels thus permitting those subscribers to receive programmes which are not generally available to the majority of the subscribers to the system and which may for example be made available locally at or adjacent to the programme exchange serving those subscribers. Other programmes available to the subscribers may be transmitted from a transmitting station over signal highways feeding a plurality of programme exchanges which may be relatively widely spaced one from the other.

In British Patent Application No. 41537/70 (U.S. Ser. No. 173,390 filed Aug. 20, 1971) specific programmes are denied to a subscriber or, more generally, a modifying or controlling function at the subscriber's station is performed by an auxiliary signal which is applied to one of the signal highways and thence to the programme exchanges for transmission through the distribution cables to a subscriber selecting that programme, which signal, in the event of the subscriber selecting that programme, transmits a reset pulse to one of the control signal wires, resulting in a selector switch at the programme exchange being moved to a datum or starting position thereby preventing transmission of that programme to the subscriber unless pre-arranged steps are taken to allow reception by the subscriber. An important object of the present application is to provide means for selective denial of programmes to different groups of subscribers.

In accordance with the present invention, there is provided a wired broadcasting system in which subscribers are connected through individual cables to a programme exchange incorporating means actuable by a subscriber for selecting a particular one of a plurality of programmes to be transmitted to the subscriber through his own individual channel, comprising means for allocating the programmes into three or more groups, and means for selectively denying two or some of the groups of programmes to subscribers.

In a three-group system, all the programmes of the two selectively denied groups can be denied to all the subscribers, or some of the subscribers may be permitted to receive the denied programmes, and these "permitted" subscribers may pertain to two groups who are permitted to receive the denied programmes either by means of selective switching means at the programme exchange concerned or by appropriate switch means at the subscriber's station. Such switching means at the subscriber's station may be released by a key. Thus any of a number of ways may be utilised to provide that the denied programmes may be made available to a predetermined number of subscribers, and these permitted subscribers may pertain to either of the two groups.

An example where the utility of this feature may be demonstrated is in the case of an installation for a conference centre where the subscriber stations can receive any of a number of television programmes and users who may wish to participate in the conference facilities can also receive the respective conference programmes which must of course be denied to other subscribers on the system, and the features of the present invention permit two independent sets of conference facilities to be made available to the respectively appropriate subscribers.

The present invention further provides for debit charging at various rates in respect of programmes taken by the different subscribers, for which purpose a debit charge meter may be provided for each subscriber at the central programme exchange or pay boxes may be provided at the subscriber's installation, and incorporating coin freed mechanism which on insertion of a coin, of a value depending on which programme is selected, prevents the reset mechanism from coming into operation while the programme is in progress.

In one arrangement the central programme exchange provides sources of different voltages, for example zero volts, −2 volts and −4 volts, which may be connected to any of the bus-bar lines at the programme exchanges, so that some of said lines bear no signal (zero volts) and others bear one or other of two different voltages (−2 or −4 volts). If the selective denial feature is required for a multiple exchange system fed by signal highways an alternating current signal system may be adopted. The connection of the different voltage conditions to the lines or signal highways is conveniently effected by means of a plug board at the transmitting station in the case of a system incorporating signal highways feeding a plurality of programme exchanges or directly to the programme exchange if required, particularly in cases where a programme exchange is not linked to others by signal highways.

The provision of dedicated channels for supplying programmes not generally available on the broadcasting system will generally be applicable to the programme exchange or to one or more programme exchanges of a multiple-exchange system, and for this purpose the lines feeding certain contacts of the subscriber's selection switches are taken to a plug board by which the dedicated programmes may be made available to certain subscribers.

In preferred arrangements rotary switches are utilised at the programme exchanges operated on a step-by-step basis in which the subscribers perform selection of the required programme by means of a standard ten-hole telephone dial. In a simple arrangement offering up to 19 programmes the selection of programmes bearing serial numbers over 9 is performed by first dialling 0 to stop the selector switch to the tenth position, followed by the dialling of a further digit to move the control switch onward to the desired programme. In the case of a system offering up to 29 programmes two successive 0 digits are used to move the stepping switch to the 20 position, followed by a further digit; and likewise three successive 0 digits are required if up to 39 programmes are available. This means that programmes bearing numbers 10, 20 and 30 are not available for distribution of programmes which are required to be denied to certain subscribers. This is because the interdigital pause would cause zeroing of the selector switch on a denied programme and would prevent selection of any programmes having higher serial numbers. It is therefore convenient for the switch positions 10, 20 and 30 to be made available for the non-dedicated programmes which are not denied to any subscribers.

The subscriber's installation may be constructed and arranged in the same way as is described in British Patent Application No. 26200/69 (now U.S. Pat. No. 3,706,040 issued Dec. 12, 1972) and it is not therefore thought necessary to describe these features.

It will be noted that in the drawings accompanying Application No. 26200/69 the switch 51 is a reset switch which on operation initiates means for returning the respective selector switch at the programme exchange to a zero or datum position. In carrying the present invention into effect certain means may be provided at the programme exchange and at the subscriber's station to ensure that if one of the denied programmes is selected by the subscriber a circuit is completed to mute the desired programme and/or to connect a reset line which results in return of the selector switch to the zero or datum position. Any suitable means may be provided at the subscriber's station, for example if the groups to which the programmes belong are identified by voltage signals a transistor voltage sensing device may be provided which actuates a relay when it senses a voltage signal allocated to a denied group the relay having contacts which short circuit the programme conductors and/or provide a circuit path for returning the selector switch to the zero position. The operation of the transistor voltage sensing device may be controlled by key-operated switch means at the subscriber's station. Corresponding arrangements may be made at the programme exchange by means of a plug board or equivalent means thus making it unnecessary for an attendant to visit the subscriber's installation to change the equipment according to which of the programmes is to be denied to that subscriber, that appropriate arrangements being made on the plug board at the central exchange.

The present invention further provides for the transmission of debit charging or taxing pulses which may be produced in the form of a train of sine squared pulses which are fed into the programmes bus-bars or to the signal highways feeding such bus-bars, and conveniently such pulses are supplied in parallel with the sound signals transmitted into the network. These pulses may be generated at a relatively low rate, for example one pulse per second, and by using sine squared pulses, which are modified half-wave pulses having a somewhat greater amplitude than half-wave sine pulses and have a relatively low harmonic content, interference with the sound signals can be readily eliminated. Such pulses may be selected according to the desired charge rate, for example only every *n*th pulse may be transmitted, the factor *n* depending on the charge rate. These pulses are used for operating a debit counter meter at the programme exchange on each subscriber's circuit and are arranged to advance the meters step-by-step so long as the subscriber's installation is connected to a programme which is to be charged, and of course different programmes selected by the subscriber may be charged at different rates, including a zero rate as appropriate.

In one arrangement the pulses are transmitted from the exchange to the subscriber's installation and are returned to the exchange over one of the control lines to operate the charge counters. The transmission path of the taxing pulses through the subscribers installation includes two series connected switch contacts one of which is open when the subscribers television receiver is switched off and the other of which is open when the subscribers installation is conditioned to receive non-charged, for example sound only, programmes.

In another arrangement the taxing pulses are fed to the meter at the exchange under the control of responder means at the exchange controlled by a separate signal fed from the subscriber's equipment to the exchange or derived from the selector switch operated under the control of the subscriber.

Figure 2:
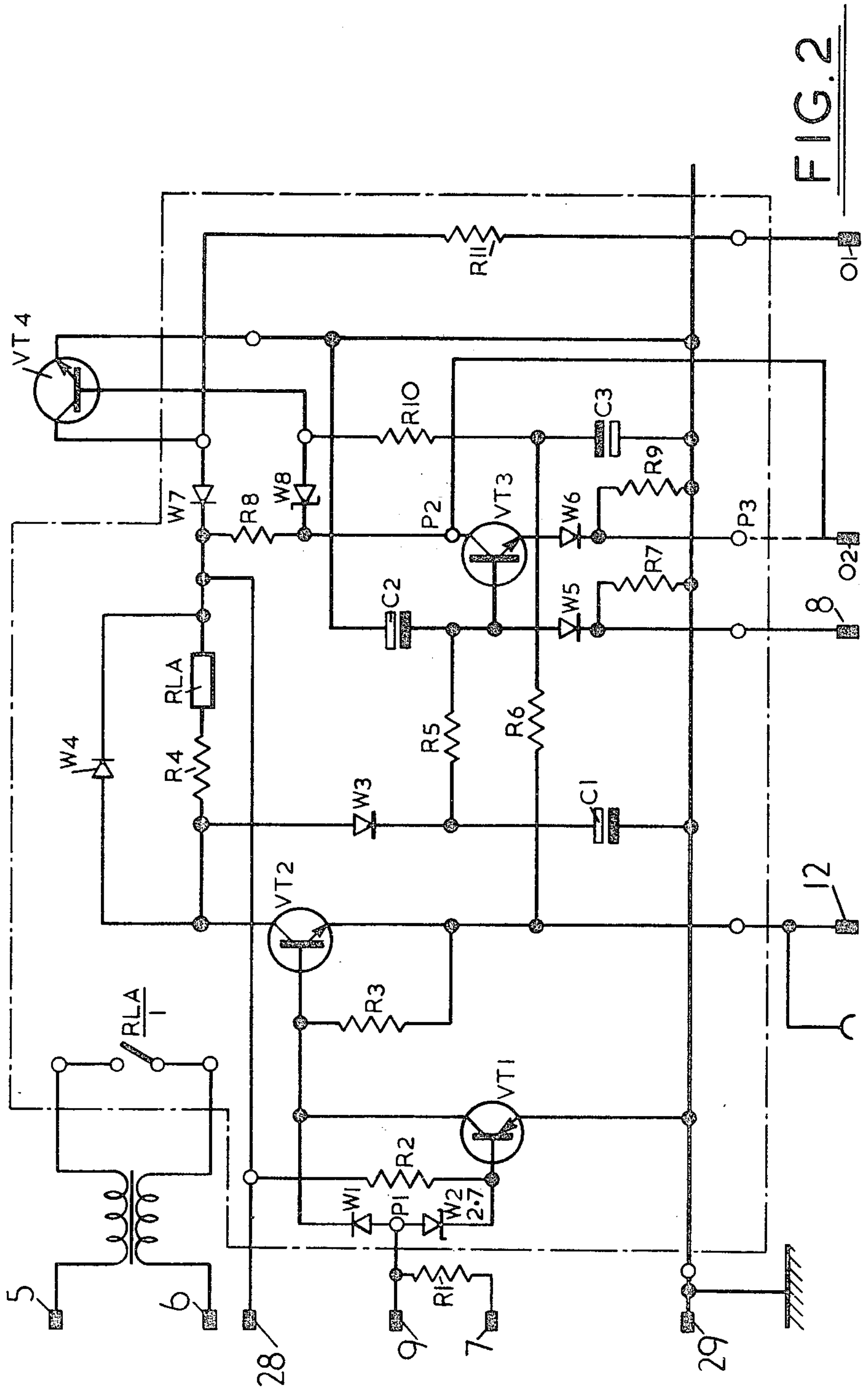

An embodiment of the present invention will now be described, by way of example, with reference to the accompanying drawings, in which:

FIG. 1 schematically illustrates a programme exchange in accordance with the invention; and FIG. 2 is a circuit diagram of one of the components schematically illustrated in FIG. 1.

Referring to FIG. 1, the exchange illustrated shows only three programme channels A, B and C and three subscriber channels D, E and F in order to simplify the drawing, but any number of programme channels may in fact be provided, for example 36, and many subscribers will be connected to the exchange.

The exchange comprises a programme denial panel 1 which is arranged to supply marking voltages of 0, −2 or −4 volts D.C. to units 2 which superimpose the selected D.C. voltage on audio programme signals provided on lines *3a*, *3b* and *3c*. The outputs of the units 2 are connected via bus-bars to subscriber selector units (not shown) located in the exchange and operable by means located in the respective subscriber's unit.

Each selector unit is connected to a respective denial unit 4 which will be described in detail hereinafter. The selector provides three inputs 5, 6 and 7 to the denial unit 4, inputs 5 and 6 being the programme transmission lines and input 7 being the marking voltage associated with the selected programme. Each denial unit 4 is also provided with a charge pulse and reset input 8 for receiving signals from the respective subscriber unit, a subscriber denial inhibit input 9 connected to a respective switch unit 10 in a subscriber denial inhibit panel 11, and a gated negative supply input 12 connected to a common gated negative supply unit 13 in a negative supply unit 14 which provides the negative voltage requirements of the entire exchange. The gated supply unit is controlled by a pulse generator 15 which supplies a pulse each minute to provide a −2 volt signal gated to 0 volt once each minute. Each switch unit 10 comprises two switches 16 and 17 which can be closed to connect with respective diodes 18 and 19 connected in parallel to a −2 volt supply. Each denial unit 4 is also provided with a subscriber's selector reset output 01 and a charge pulse output 02.

FIG. 1 also illustrates a means for charging subscribers for programmes received. This means comprises a divider 20 connected to the pulse generator 15, a binary to decimal convertor 21 providing fifteen outputs only the first three and last one of which are shown, shaping filters 22, selectors 23 for selecting any one of the convertor outputs, driver amplifiers 24 and D.C. isolators 25.

The first, second, third and last outputs of the convertor 21 respectively comprise one square wave pulse every 15 minutes, two square wave pulses separated by 1 minute every 15 minutes, three square wave pulses at 1 minute intervals every 15 minutes, and one square wave pulse very minute. As shown, the first, second and last outputs are connected by the selectors 23 to the programme channels A, B and C respectively, each pulse on the convertor output inducing a single negative pulse on the respective programme channel.

When a subscriber selects a programme, the D.C. marking voltage of that programme is passed to the respective denial unit and the charge pulses associated with that programme pass to the respective subscriber's unit and are returned to the denial unit 4. If the programme marking voltage is that of a permitted programme, the denial unit provides on receipt of a charge pulse a charge-pulse output to a respective D.C. isolator 26 connected to a respective counter 27. Each counter receives a one second duration pulse each minute from the generator 15, coincident pulses from the generator and the respective denial unit 4 causing the counter to register one unit of charge. It will be appreciated that any one of 15 charge rates can be selected for any particular programme.

Referring to FIG. 2, the operation of the denial unit illustrated will now be described in detail. When the subscriber selects a programme, the D.C. marking voltage associated with that programme is connected to input 7. The respective unit 10 of the subscriber denial panel 11 is connected to input 9, a positive voltage is applied to input 28, and the output of the gated supply 7 is connected to input 12.

If the signal at point P1 is −2 volts, this signal is effectively isolated by diode W1 and zener diode W2. If the signal is −4 volts, diode W2 breaks down, the positive bias provided by resistor R2 at the base of transistor VT1 is replaced by a negative voltage, and the base of transistor VT2 is effectively earthed to an earthed input 29. This enables transistor VT2 to conduct whenever the input 12 is provided with −2 volts from the gated negative supply 7. If the signal at point P1 is 0 volts, the negative bias provided by resistor R3 at the base of transistor VT2 is replaced by zero volts as diode W1 can conduct, and therefore transistor VT2 can conduct.

If the switches 16 and 17 of the associated denial panel unit 10 are both open, then the marking voltage of the selected programme is present at point P1. If the switch 16 is closed, the voltage at point P1 assumes the marking voltage if the marking voltage is −2 or −4 volts. If however the marking voltage is 0 volts, diode 18 in unit 11 can conduct and current passes through resistor R1 so that point P1 is held at −2 volts, which signal is isolated by diodes W1 and W2. If the switch 17 is closed, the voltage at point P1 assures the marking voltage if the marking voltage is 0 or −2 volts. If however the marking voltage is −4 volts, diode 19 can conduct and point P1 is again held at −2 volts and isolated.

Thus the denial unit is normally actuated by 0 or −4 volts marking voltages, but either or both of these signals can be rendered ineffective.

When the base of transistor VT2 is at 0 volts, a current path is formed between the positive input 28 and the gated negative supply input 12 through a reed relay RLA and resistor R4. The contacts RLA/1 of the relay close, shorting inputs 5 and 6 which are directly connected to the subscriber's programme signal line. The selected programme is thus temporarily muted.

When the denial unit is inactive, the positive voltage provided at input 28 provides a current through relay RLA, resistor R4, diode W3, resistor R5, diode W5 and resistor R7 to earthed input 29, and capacitors C1 and C2 are charged. This provides a positive voltage at the base of transistor VT3 which forms a conductive path from the positive supply input 28 through resistor R8, diode W6 and resistor R9 to the earthed input 29.

Transistors VT2 and VT3 form a bistable switch and as soon as transistor VT2 conducts, the voltage at its collector drops and diode W3 isolates capacitor C1 from the said collector. The voltage across capacitor C2 decays, and after a period determined by the capacitor C2 and the resistor R6 transistor VT3 turns off. The voltage across zener diode W8 now increases causing breakdown of the diode W8 and transistor VT4 then conducts. The associated subscriber's selector (not shown) located within the exchange is spring reset to a datum position on being released by a reset coil which coil is connected to output 01 in series with a positive voltage supply (not shown). When transistor VT4 conducts, current passes through the coil and resistor R11 to earthed input 29 and the selector is reset. A diode W7 prevents current passing between input 28 and output 01. The marking voltage is thus removed from input 7 when the selector is reset, and the base of transistor VT2 is held at the voltage present at input 12. A capacitor C3 is provided which will charge through resistor R10 when transistor VT3 is not conducting and zener diode W8 has broken down. A resistor R6 is connected between capacitor C3 and input 12 so that the voltage or capacitor C3 makes the voltage on the emitter of transistor VT2 less negative and ensures that the transistor turns off. After a period determined by the resistor R5 and the capacitor C2, the base of transistor VT3 is sufficiently positive for the transistor to conduct whereafter the circuit returns to its normal condition and is ready for a further selection to be made.

When a programme is selected which is not denied, negative charge pulses pass to the subscriber's unit and are returned through contacts in the subscriber's unit indicating that the unit is operating to input 8 and onto the base of transistor VT3 via diode W5. The charge pulses are not of sufficient amplitude or length to turn the transistor VT3 off but do reduce the current through the transistor VT3, and one second pulse charge outputs are thus generated which pass to the respective counter via output OZ which may be connected at point P2 to the collector or at P3 in an emitter follower configuration. Each charge output which is coincident with an output pulse of the pulse generator causes the respective counter to count one.

The −2 volt signal on input 12 is gated for 1 second periods each minute so that a programme denial sequence cannot be initiated by the conduction of transistor VT2 when a pulse is provided to the counter by the pulse generator. This prevents the subscriber being charged for selecting a denied programme as would occur if transistor VT2 conducted and hence the voltage at the base of transistor VT3 decreased at the time that a charge pulse could be present.

Each subscriber is provided with a reset button the pressing of which causes a negative pulse to appear at input 8, the pulse being of sufficient length and amplitude to cause the transistor VT3 to stop conducting and the transistor VT4 to conduct and reset the selector.

What is claimed is:

1. A wired broadcasting system in which subscribers are connected through individual cables to a programme exchange incorporating means actuable by a subscriber for selecting a particular one of a plurality of programmes to be transmitted to the subscriber through his own individual channel, comprising means for allocating the programmes into three or more groups, and means for selectively denying two of the groups of programmes to subscribers, means for marking each of the plurality of programmes with any one of a plurality of voltage signals to indicate the group to which each programme belongs, means provided for each subscriber channel for indicating which of the marking voltage signals identify groups of programmes which are to be denied to particular subscribers, and means for sensing the marking voltage signal associated with a programme selected by the subscriber and denying the selected programme when the sensed voltage indicates a group of programmes which is to be denied, wherein the sensing and denying means comprises a denial unit at the exchange for each subscriber connected to receive a first input indicative of the marking voltage signal of a selected programme, and a second input indicative of which of the marking voltage signals identify programmes which are to be denied to the respective subscriber, the denial unit being adapted to deny a selected programme to the subscriber when the first and second inputs indicate the same marking voltage signals, wherein the denial unit further comprises an input circuit for the first and second inputs and a bistable output circuit wherein the input comprises two back-to-back reverse biased diodes one of which is a zener diode, wherein the first and second inputs are connected to the common terminal of the diodes respectively through a resistor and a direct connection, means connecting the said common terminal with the intermediate voltage signal whereby the voltages are such that the zener diode does not break down and when the common terminal carries a first one of the other marking voltage signals the zener diode conducts, and when the common terminal carries the second of the said other marking voltages the other diode conducts, and means provided for marking each programme with any one of three D.C. voltages, the intermediate one of the three voltages marking that group of programmes which is not to be denied to any of the subscribers.

2. A system according to claim 1, wherein the base of a normally non-conducting first transistor is connected to the zener diode, the first transistor being arranged to turn on when the zener diode is caused to conduct.

3. A system according to claim 2, wherein the bistable circuit comprises a normally non-conducting second transistor and a normally conducting third transistor.

4. A system according to claim 3, wherein the second transistor is connected to the first transistor and the said other diode and is in series with the coil of a relay.

5. A system according to claim 4, wherein the contacts of the relay are normally open and close when the second transistor conducts, the contacts being arranged to mute any programme signal on the particular subscriber's channel when closed.

6. A system according to claim 4, wherein the second transistor is turned on when the said other diode conducts or the first transistor is turned on.

7. A system according to claim 6, wherein the third transistor is turned off a predetermined period after the second transistor has been turned on, the predetermined period being determined by a capacitive and resistive circuit.

8. A system according to claim 7, comprising a normally non-conducting fourth transistor the base of which is connected by a normally non-conducting zener diode to a potential divider in series with the third transistor, the turning off of the third transistor causing the voltage across the zener diode to increase to the breakdown voltage and to turn on the fourth transistor.

9. A system according to claim 8, wherein a capacitive and resistive feedback channel is provided between the fourth and second transistors to turn off the second transistor a predetermined interval after the fourth transistor is turned on.

10. A system according to claim 8, wherein each subscriber is provided with a rotary selector at the exchange which the subscriber may actuate to select any desired programme the selector being adapted to return the marking voltage of a selected programme directly to the respective denial unit as the same first input.

11. A system according to claim 10, wherein each selector is provided with a reset coil connected in series with the fourth transistor of the denial unit the coil when energised releasing the selector which is spring reset to a datum position.

12. A system according to claim 11, wherein each subscriber unit is provided with a manually actuable reset switch the actuation of which applies a voltage to the third transistor to turn it off causing the turning on of the fourth transistor and the resetting of the selector.

13. A system according to claim 1, comprising a plurality of selectors at the exchange actuable by respective subscribers to select any one of the programmes and adapted to provide the said first input.

14. A system according to claim 13, wherein each selector is rotary and may be spring reset to a datum position by the passage of a current through a reset coil.

15. A system according to claim 14 wherein the coil may be energised by subscriber actuable means and by the denial unit upon selection by the subscriber of a denied programme.

16. A system according to claim 13, wherein each selector returns the marking voltage signal of a selected programme directly to the respective denial unit as the said first input.

17. A system according to claim 1, wherein the indicating means comprises a plurality of subscriber denial inhibit units at the exchange actuable to provide the said second input to the respective denial units.

18. A system according to claim 17, wherein each denial inhibit unit is connected to a common D.C. voltage source providing the said intermediate voltage.

19. A system according to claim 18, wherein each denial inhibit unit comprises two switches in parallel which may be connected to respective ones of a pair of diodes arranged with opposed polarities in parallel and themselves connected to the said intermediate voltage source.

20. A system according to claim 1, including a programme denial unit for superimposing marking voltages on each programme signal.

21. A system according to claim 20, including means superimposing the marking voltages on the audio signals of the respective programmes.

22. A system according to claim 21, wherein the programme denial unit comprises a plurality of switches for connecting the respective audio programme signals to a plurality of common voltage sources.

23. A system according to claim 1, comprising means for selectively applying to respective programmes any one of a plurality of charge pulse signals to indicate the cost of the programmer and means associated with each subscriber channel for counting the number of pulses applied to a programme whilst that programme is being received by the respective subscriber.

24. A system according to claim 23, wherein the pulse signals are applied to the audio signals of the respective programmes.

25. A system according to claim 23, comprising a pulse generator the output of which is connected through a divider to a binary-to-decimal converter having a plurality of outputs to which different pulse signals are applied, and a plurality of selectors for applying any one of the different pulse signals to respective programmes.

26. A system according to claim 25, comprising a plurality of counters at the exchange for respective subscriber channels.

27. A system according to claim 26, wherein each counter is connected directly to the pulse generator and is adapted to count only those pulses received from a selected programme which are coincident with pulses received directly from the pulse generator.

28. A system according to claim 12, comprising a pulse generator the output of which is connected through a divider to a binary to decimal converter having a plurality of outputs to which different pulse signals are applied, means associated with each subscriber channel for counting the number of pulses applied to a programme whilst that programme is being received by the respective subscriber, and a plurality of selectors for applying any one of the different pulse signals to the audio signals of respective programmes, wherein the pulse signals applied to a programme selected by a subscriber are passed to the subscriber unit and return to the respective denial unit through a path which is closed except when the subscriber's unit is operating, the pulse signals being applied to the base of the normally conducting transistor and being of a polarity and amplitude such that the current through the third transistor is reduced but not stopped, and the counting means being connected to the third transistor so as to receive a pulse each time this occurs.

29. A system according to claim 28, wherein the second transistor is connected to a D.C. bias from a gated supply unit controlled by the pulse generator, the supply being gated whenever a charge pulse could be received from any programme so that the turning on of the second transistor is temporarily prevented on all such occasions.

30. A system according to claim 23, wherein the charge pulse signals comprise one or more sine squared pulses.

31. A system according to claim 1, wherein the sensing and denying means comprises a transistor voltage sensing device at each subscriber unit adapted to deny a programme selected by a subscriber when it senses a voltage identifying a group of programmes which is to be denied to that subscriber.

32. A system according to claim 31, comprising a relay actuable by the voltage sensing device when a denied programme is selected to mute that programme.

33. A system according to claim 31, comprising a relay actuable by the voltage sensing device when a denied programme is selected to reset the subscribers selector to a datum position.

34. A system according to claim 31, comprising control means at each subscriber unit actuable to determine which groups of programmes are to be denied to that subscriber.

35. A system according to claim 34, wherein the control means are actuable with a key.

36. A system according to claim 31, comprising means for applying charge pulse signals to respective programme signals to indicate the cost of the programmes, means associated with each subscriber channel for counting the pulse signals applied to programmes received by the respective subscribers.

37. A system according to claim 36, wherein the counting means comprise meters at the exchange.

38. A system according to claim 36, comprising meters at the respective subscriber units.

39. A system according to claim 36, comprising coin mechanisms at each subscriber unit adapted to indicate the value of coins deposited therein, and means for deducting a predetermined amount from the indicate amount each time a charge pulse is applied to the signal of a programme being received, the mechanism being adapted to prevent receipt of programmes by the subscriber whenever the indicated amount is reduced to zero.

* * * * *